United States Patent [19]
Paine

[11] Patent Number: 5,535,631
[45] Date of Patent: Jul. 16, 1996

[54] STRAIN GAGE ARRAY WITH MOUNTING MECHANISM

[76] Inventor: Alan Paine, P.O. Box 1452, W. Covina, Calif. 91791

[21] Appl. No.: 423,217

[22] Filed: Apr. 17, 1995

[51] Int. Cl.⁶ ........................................ G01L 1/00
[52] U.S. Cl. .................... 73/855; 73/862.621
[58] Field of Search .................. 73/763, 775, 786, 73/855, 862, 862.06, 862.56, 862.621

[56] References Cited

U.S. PATENT DOCUMENTS

| | | | |
|---|---|---|---|
| 2,381,283 | 8/1945 | Hathaway | 73/775 |
| 3,433,699 | 3/1969 | Rumble | 73/775 |
| 3,986,254 | 10/1976 | Nordstrom | 73/855 |
| 4,023,402 | 5/1977 | Watanabe | 73/855 |
| 4,327,591 | 5/1982 | Dybel et al. | 73/855 |

*Primary Examiner*—Richard Chilcot
*Assistant Examiner*—Ronald Biegel
*Attorney, Agent, or Firm*—J. E. Brunton

[57] ABSTRACT

A strain gage apparatus that includes a unique mounting mechanism which enables the apparatus to be directly mounted on a load-bearing structure without having to modify the structure thereby making the apparatus particularly useful for measuring the weight of articles and materials disposed within various types of structures as, for example, tanks and hoppers.

17 Claims, 3 Drawing Sheets

STRAIN GAGE ARRAY WITH MOUNTING MECHANISM

BACKGROUND OF THE INVENTION

1. Field of the Invention

The present invention relates generally to strain gage type measuring devices. More particularly, the invention concerns a novel strain gage apparatus that includes a unique mounting mechanism which enables the apparatus to be directly mounted on a load-bearing structure without having to modify the structure thereby making the apparatus particularly useful for measuring the weight of articles and materials disposed within various types of structures such as tanks and hoppers.

2. Discussion of the Invention

Industries that use tanks and hoppers for batching inventory or mixing ingredients require a simple and inexpensive system for measuring the weight of articles or materials contained therewithin. In the past, such measurements have typically been accomplished through the use of load cells that are positioned beneath the legs of the tank or hopper. However, in order to install the load cells, the tank or hopper generally must be raised and, in certain instances, the legs of the tank or hopper must be cut or otherwise structurally modified in order to install the load cells. For example, in some instances, both cutting and welding operations are involved in the installation of the load cell. The use of conventional load cells for this purpose has several disadvantages, including the rather substantial cost, inconvenience, and time delays in the installation of the load cells.

Another prior art approach sometimes used for measuring the weight of articles or materials contained within supporting structures involves the use of strain gage devices that are mounted within drilled holes formed in the structural members of the supporting structure. In such instance, the strain gages are adapted to measure the deformation of the hole in the structural member as the load is increased. Typically the installation of such strain gage devices is difficult and reliable measurement of the deformation of the drilled hole is frequently suspect. Further, the use of such an approach is even more suspect when relatively small structures are involved.

Exemplary of yet another approach to making such measurements is the extensometer disclosed in U.S. Pat. No. 4,522,066 issued to Kistler et al. This device uses machined mechanical links to measure stresses in two axes. Temperature compensation is achieved mechanically by sensing both axes. With this arrangement, as expansion due to thermal changes occurs, the two axes nullify the effect of temperature. The effectiveness of such a system, however, requires that the mechanical links be very accurately machined. This precise machining can be both time consuming and costly. Further, the extensometer must be positioned accurately, both for correct load measurement and for cancellation of isotropic (thermally induced) strains.

U.S. Pat. No. 5,289,722 issued to Hugh S. Walker and Robert J. Dorgan addresses the problem of aligning and bonding strain gages to various types of structures without damaging either the structure or the strain gage. The strain gage assembly disclosed in this patent comprises a substrate having an adhesive applied to the majority of the undersurface thereof and terminating in an adhesive end line. A strain gage unit is adhered to the adhesive-bearing surface of the substrate. A selectively removable protective film is applied over at least a portion of one surface of the substrate. This requires a skilled technician familiar with strain gages and the specialized bonding processes involved.

As will be more fully appreciated from the discussion which follows, use of the novel apparatus of the present invention does not require any drilling or mechanical alteration to the structure being measured. Rather, the apparatus of the invention includes a simple and highly effective installation mechanism that enables a positive nondestructive interconnection of the apparatus with the structure being measured.

In one form of the invention, the apparatus includes a plurality of fully active, and prewired wheatstone bridges which effectively cancel temperature errors. Another important feature of the apparatus of the invention resides in the fact that it is specifically designed to be used in conjunction with conventional weighing instrumentation such as a Weigh Meter. More particularly, the apparatus of the invention has the ability to convert the analog signal to a digital signal for processing and correction and then to reconfigure the data back to analog signals for input to the Weigh Meter. In the preferred form of the invention, a summer-adder means functions to receive and appropriately sum the output of each of the wheatstone bridges.

SUMMARY OF THE INVENTION

It is an object of the present invention to provide a measuring device that, when mounted to a structure such as a tank or hopper, measures strain induced in the structure to produce an electrical output which is precisely proportional to the load on the structure.

Another object of the invention is to provide an apparatus of the aforementioned character that readily interfaces with conventional weighing instrumentation.

Another object of the invention is to provide a device of the character described, which includes a novel attachment mechanism that enables easy installation of the apparatus by unskilled workers using conventional tools without the necessity of in any way altering or structurally modifying the structure to be measured.

Another object of the invention is to provide a device of the class described which includes baseline zero and span thermal compensation.

Yet another object of the invention is to provide an apparatus such as described in the preceding paragraphs that can achieve high sensitivity without significant increase in noise.

In summary, the foregoing objects of the invention are achieved through the use of a plurality of foil strain gages arranged in a wheatstone bridge configuration with the interwiring between the gages being etched on the same foil that the gages are etched. The etched foil is laminated to a substrate comprising a flexible material such as mylar or polyamide so that the strain imposed by the structure on the substrate is transferred directly to the foil. In the preferred form of the invention, the finished array of gages and the interwiring thereof is arranged in a poisson configuration. (Gages Alternate at 90 degrees.)

The array of gages and interwiring thus described is mounted to the structure to be measured by means of a novel mounting mechanism that is specially designed to apply a precise, uniform pressure to the array during bonding of the array to the structure. In one form of the invention, the mounting mechanism comprises a hollow housing within which is mounted a magnet and a biasing means for controllably exerting a controlled pressure on the array. The array itself is mounted on a rubber-like material, such as a silicon rubber platform, which, in turn, is mounted on a pressure plate carried by the housing. A pair of bubble type levels are provided on the front cap of the housing for precisely aligning the housing in a manner to correctly position the array. The magnet secures the mechanism to the structure while the biasing means, which includes a novel release mechanism, is used to apply the correct pressure to the array so as to securely bond it to the structure. When the structure is made of nonferrous material, a mechanical strapping method is employed to secure the mechanism to the structure.

The array portion of the apparatus uniquely comprises a plurality of independent wheatstone bridges arranged in poisson configuration. The wheatstone bridges are interconnected through a harness to a circuit board which includes an operational amplifier that is used as a summer/adder. More particularly, the amplifier receives the output of each wheatstone bridge and sums them giving a boost in gain without significant increase in noise. An analog to digital converter is connected to the output of the summing amplifier. This converter, in turn, interfaces with a microprocessor to correct for nonlinearities, hysteresis, creep and zero return. The microprocessor then interfaces with a digital to analog converter which permits most of the original signal to pass through with only the error portion of the original signal being altered to correct for errors. This feature also permits the apparatus to be readily used with standard weighing equipment such as weigh meters.

DESCRIPTION OF THE INVENTION

Figure 1:
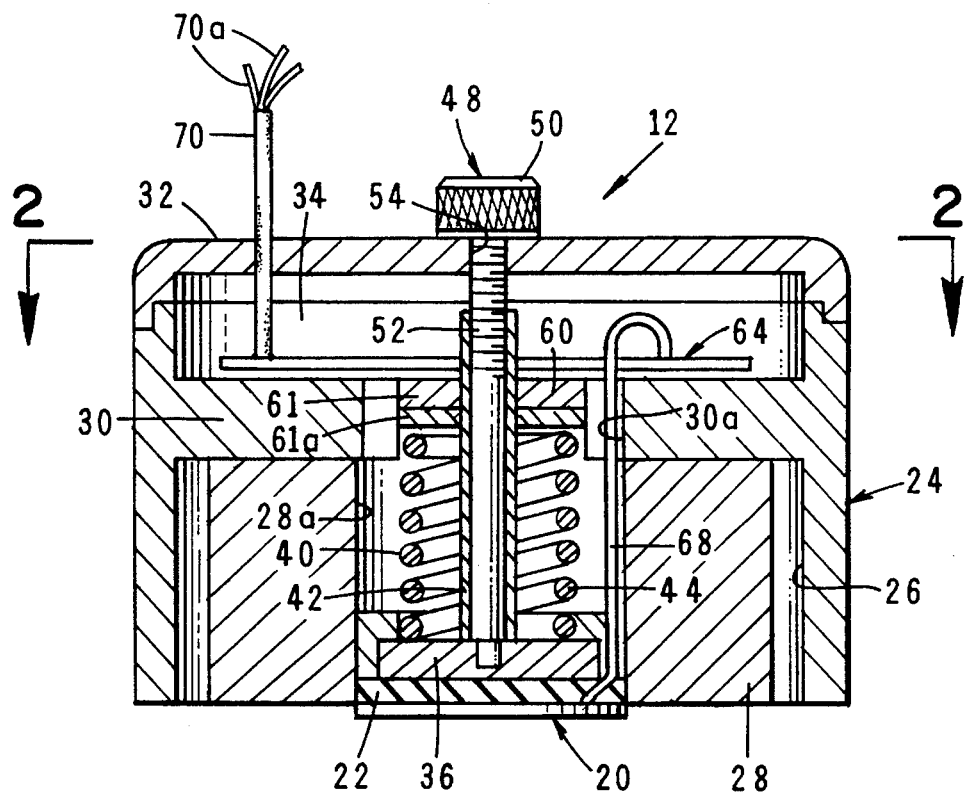
FIG. 1 is a side-elevational, cross-sectional view of one form of the apparatus of the present invention.
Figure 2:
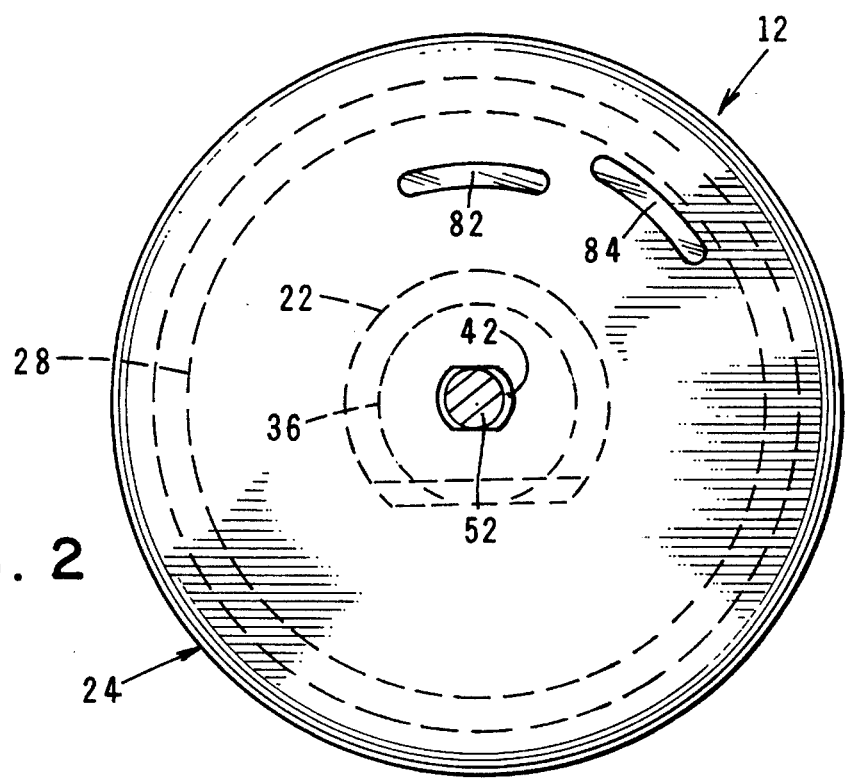
FIG. 2 is a view taken along lines 2—2 of FIG. 1.
Figure 3:
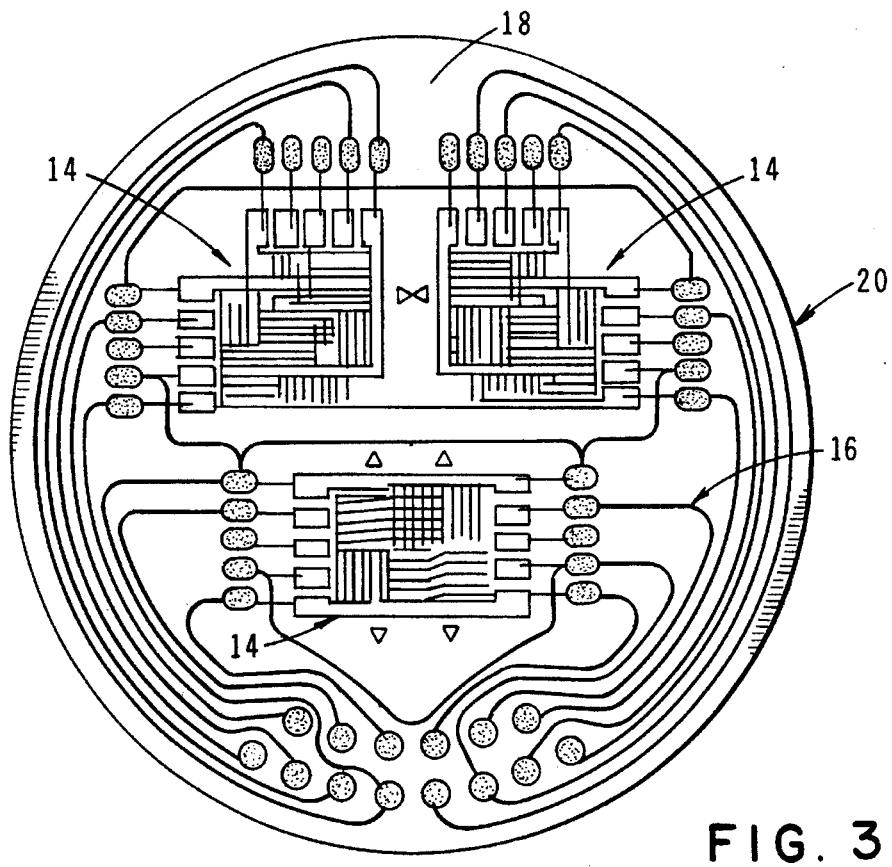
FIG. 3 is a generally diagrammatic top plan view of the mounting substrate upon which the strain gages and etched foil interconnecting circuitry is affixed.

Referring to the drawings and particularly to FIGS. 1, 2, and 3, one form of the strain measuring apparatus of the present invention is there illustrated and generally designated by the numeral 12. The apparatus which is specifically adapted for use in measuring deflection in load-bearing structural members here comprises sensor means for sensing deflection in the structural member, including a sensing array comprising a plurality of foil strain gages 14 arranged in a wheatstone bridge configuration with interwiring 16 between the gages being etched on the same foil 18 as that upon which the strain gages 14 are etched (FIG. 3). The etched foil 18 is laminated to a substrate 20 that comprises a flexible material such as mylar or polyamide so that the strain imposed by the structure on the substrate will be transferred directly to the foil. In the preferred form of the invention, the array of gages 14 and the interwiring thereof is arranged in a poisson configuration of the character illustrated in FIG. 3. Strain gages 14 are of a character well known in the art and are available from sources such as Micro Measurements, Inc. of Raleigh, N.C.

Turning to FIG. 1, it is to be noted that substrate 20 is mounted on an elastomeric platform 22 which can be constructed of any rubber-like material such a silicon rubber. Substrate 20 can be bonded to platform 22 by any suitable means such as a commercially available adhesive.

Forming an extremely important aspect of the apparatus of the present invention is mounting means for mounting the sensor means to the structure to be measured, as, for example, a tank or hopper. As best seen by referring to FIG. 1, the mounting means of the present form of the invention comprises a housing 24 having a first chamber 26 within which an annular-shaped magnet 28 is carried. Housing 24 includes a transversely extending separating wall 30 which, in conjunction with a closure cap 32 that is connected to housing 24, forms a second internal chamber 34. Magnet 28 is held in position within chamber 26 in the manner shown in FIG. 1 with magnet 28 magnetically engaging separating wall 30.

Also forming a part of the mounting means of the present invention is a pressure plate 36 to which platform 22 is suitably interconnected by an appropriate bonding adhesive. Pressure plate 36 is telescopically movable within a central passageway 28a of annular-shaped magnet 28. As indicated in FIG. 1, separator wall 30 includes a centrally disposed aperture 30a which aligns with passageway 28a formed by magnet 28.

Disposed within the central passageway of magnet 28 and within opening 30a formed in separator wall 30 is biasing means for controllably urging pressure plate 36 outwardly of passageway 28a of magnet 28, that is, in the direction of the structural member to which the sensor means is to be interconnected.

In the embodiment of the invention shown in the drawings, the biasing means comprises a spring assembly 40 which includes a central column 42 and a coil spring 44 which is receivable over central column 42 in the manner shown in FIG. 1. The biasing means of this form of the invention also includes release means for releasably interconnecting spring assembly 40 to closure member 32. This release means is here provided in the form of a threaded connector member 48 which includes a knurled head portion 50 and a threaded shank portion 52. Threaded shank portion 52 extends through an aperture 54 form in closure member 32 and then into an internally threaded portion of central column 42 for threadable interconnection therewith. As shown in FIG. 2, column 42 has a flat machined along its length and is locked against rotation by a backing plate assembly 60. Spring 44 is normally held captive in a compressed state between pressure plate 36 and the backing plate assembly 60 in the manner shown in FIG. 1. Backing plate assembly 60 comprises a pair of fixedly mounted disks 61 and 61a each of which includes a central aperture within which central column 43 is telescopically movable. With this construction, so long as the release means, or release assembly 48 is interconnected with the central column, pressure plate 22 will be constrained against outward movement due to the urging of spring 44. However, upon release of the release assembly from central column 42 by unscrewing connector member 48, spring 44 will forceably urge pressure plate 36, along with the sensor means which is interconnected thereto, outwardly of the device in a direction toward the structure to which the sensor means is to be interconnected. It is apparent that spring 44 can be appropriately compressed to an extent that an optimum outward pressure will be exerted by the spring on the pressure plate and the sensor means so as to facilitate bonding of the sensor means to the supporting structure.

It should be noted that the elastomeric mounting platform 22 functions to uniformly distribute the pressure exerted on the sensor means by pressure plate 36 and spring 44. For reasons presently to be discussed, the maximum force which can be exerted on the pressure plate by spring 44 is carefully controlled so that it is always less than the magnetic force exerted by magnet 28 which functions to initially position housing 24 relative to the structural member.

Figure 5:
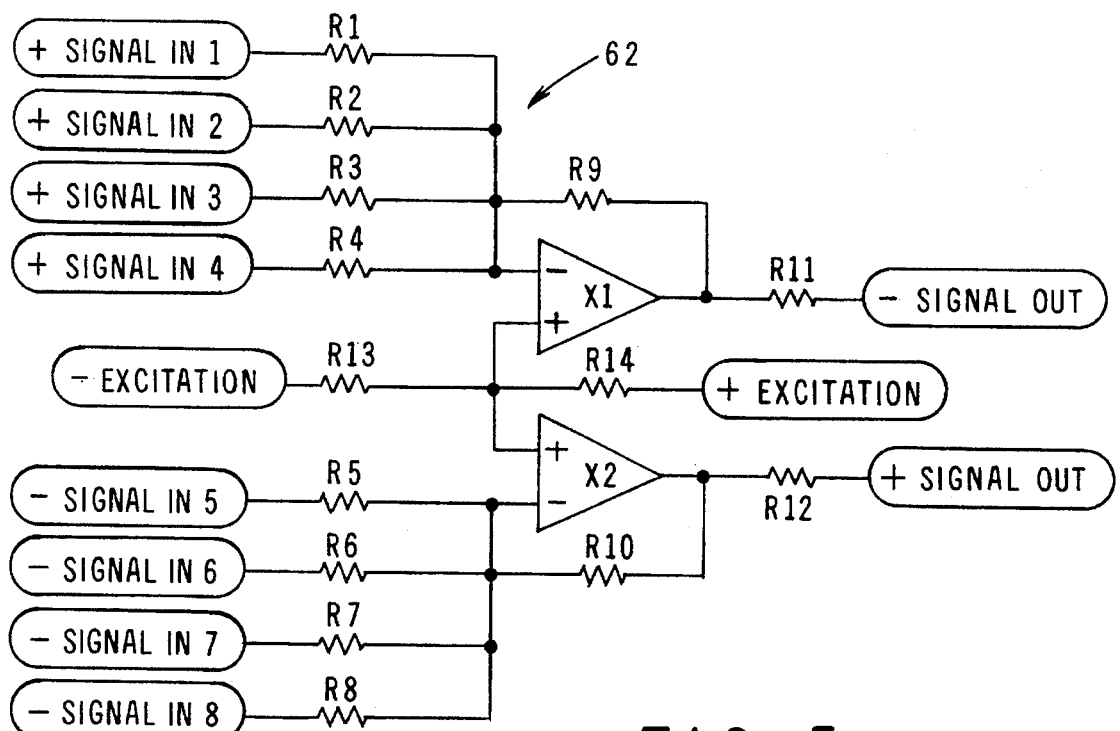
FIG. 5 is a generally schematic view illustrating the circuitry involved in one form of the apparatus of the invention.
Figure 6:
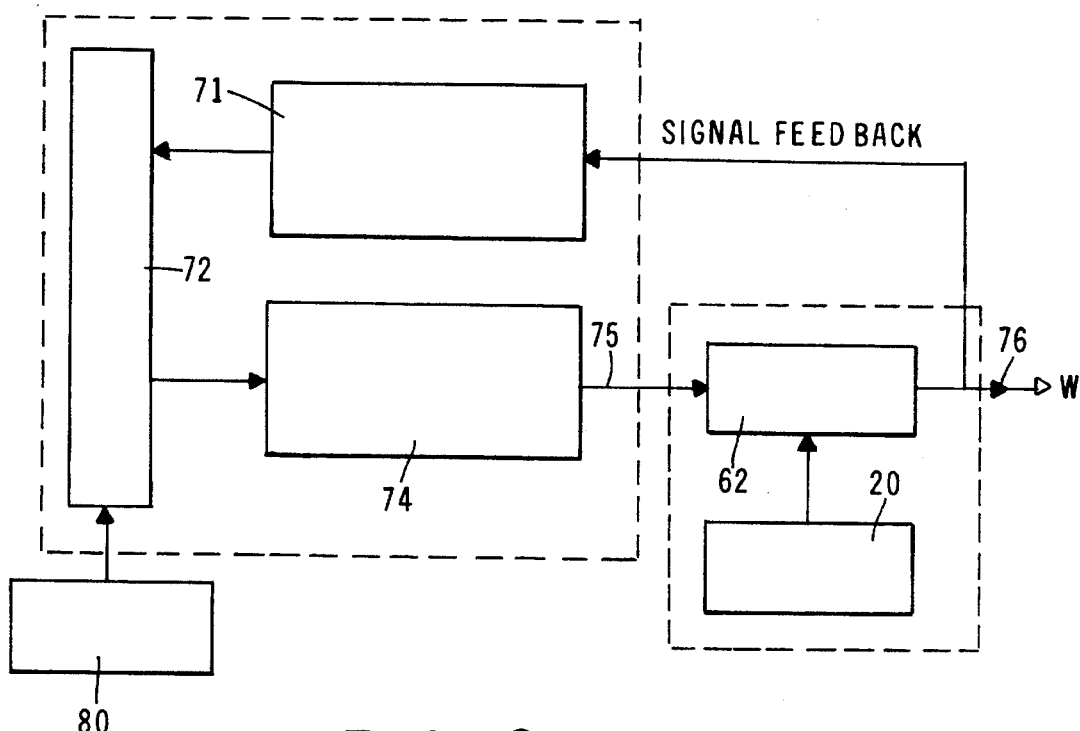
FIG. 6 is a block diagram of the apparatus of the invention showing the major sub-components of the apparatus and their method of interconnection.

Referring particularly to FIGS. 1, 5, and 6, the previously identified summer/adder means of the invention is here provided in the form of an operational amplifier 62. Amplifier 62 is connected to a circuit board 64 and functions to receive and appropriately sum the output of each of the wheatstone bridges 14. As best seen in FIG. 1, circuit board 64 is preferably disposed within chamber 34 of the housing 24 and is interconnected with the sensor means by electrical connectors 68 which pass through opening 30a formed in separator wall 3 and then through central passageway 28a of magnet 28. In a similar manner, the signal output from the circuit board is carried outwardly of housing 24 via electrical connectors 70 which extend through an opening provided in member 32.

Turning now to FIG. 6, it can be seen that the output of operational amplifier 62 is connected to a high resolution analog to digital converter 71 which, in turn, is interconnected with a microprocessor 72 of conventional design. Interconnected with the output of microprocessor 72 is a medium resolution digital to analog converter 74, the output of which is, in turn, connected to the summing means, or operational amplifier 62 by connector 75. In a manner well understood by those skilled in the art, microprocessor 72 functions to perform the calculations necessary for signal correction and compensation. Microprocessor 72 is of standard construction and is readily commercially available from sources such as Motorola Corp. and preferably includes a read-only memory for permanent storage, a random access memory for variable and static storage during calculations, and an electrically erasable, programmable read-only memory for long-term storage of calibration coefficients when the device is not powered.

The high resolution analog to digital converter 71, which permits the micro-controller to measure the summed output of the sensor with a very high accuracy is readily available from sources such as Digi Key Corp. of Riverfalls, Minn. as is the medium resolution converter 74. It is preferable that the microprocessor exhibit twice the accuracy and resolution of the Weigh Meter to which the system output 76 is interconnected.

The medium resolution digital to analog converter 74 produces a bi-polar signal which is added to the output of the sensor to provide the corrected output for the Weigh Meter "W" (FIG. 6). The accuracy and resolution of the correction is typically as good as, or better than, the accuracy and resolution of the Weigh Meter "W". The total correction range is on the order of ±2 millivolts by 1 microvolt for a 30 millivolt full scale sensor. In a manner well understood by those skilled in the art, the microprocessor adds or subtracts a correction signal from the output of the summer amplifier. The correction signal comprises a linear correction, a hysteresis correction, a creep compensation, and a temperature compensation. In this regard, an optional addition to the apparatus of the invention comprises a temperature sensor 80 that can be interconnected to the microprocessor 72 in the manner shown in FIG. 6 to provide temperature data concerning the temperature of the structure to which the sensor means is interconnected. Temperature sensor 80 is of a character well known in the art and is available from Micro Measurements, Inc.

With the apparatus of the invention assembled into the configuration shown in FIG. 1, the apparatus can be initially connected to a selected area of the supporting structure. However, before interconnection of the apparatus with the structure, the bare metal of the connecting area is preferably carefully precleaned so that it will accept the adhesive that has been selected for bonding the sensor means, or substrate 20, to the structure. By way of example, preparation of the surface of the structure can be accomplished by sanding and cleaning with alcohol. After the surface has been cleaned, a bonding adhesive such as cyanoacrylate glue or epoxy is applied both to the cleaned surface and to the sensor means, or substrate 20, which carries the strain gages. The apparatus is then initially interconnected with the structure to be measured with magnet 28 firmly anchoring the apparatus to the structure. With the magnet 28 holding the apparatus in position on the structure, bubble levels 82 and 84, which are mounted on closure member 32 (FIG. 2), are used to properly align the wheatstone bridge array 14. More particularly, when the apparatus is mounted to a vertically disposed structure, bubble level 82 is used for measuring poisson ratio. For shear measurement, bubble level 84 is used so as to insure proper alignment of the wheatstone bridge array. Bubble levels 82 and 84 are readily commercially available from several sources, including McMaster Carr Corp. of Norwalk, Calif.

Following appropriate alignment of the wheatstone bridge array, head 50 of the release mechanism is rotated in a direction to unscrew shaft 52 from column 42. Upon separation of shaft 52 from column 42, the biasing means or spring 44 will cause an outward pressure to be exerted on pressure plate 36 and, in turn, on the sensor means 20. As previously mentioned, during this bonding step, elastomeric platform 22 functions to uniformly distribute the pressure exerted by the spring on the pressure plate so as to positively urge the adhesive on the sensor means into secure bonding engagement with the adhesive on the surface of the structural member. Since the pressure exerted by spring 44 is less than the force exerted by magnet 28 which tends to hold the housing in position, the entire apparatus will remain stationary with respect to the structural member during the bonding process. The apparatus having been thus bonded to the supporting structure, leads 70a of connector 70 can be appropriately interconnected with the high resolution analog to digital converter 71 or with the Weigh Meter "W" in the manner shown in FIG. 6. Weigh Meters of the character shown, in FIG. 6 are readily available from commercial sources such as Muse Measurements Corp. of San Dimas, Calif. and from Total Comp, Inc. of Fairlawn, N.J.

Figure 4:
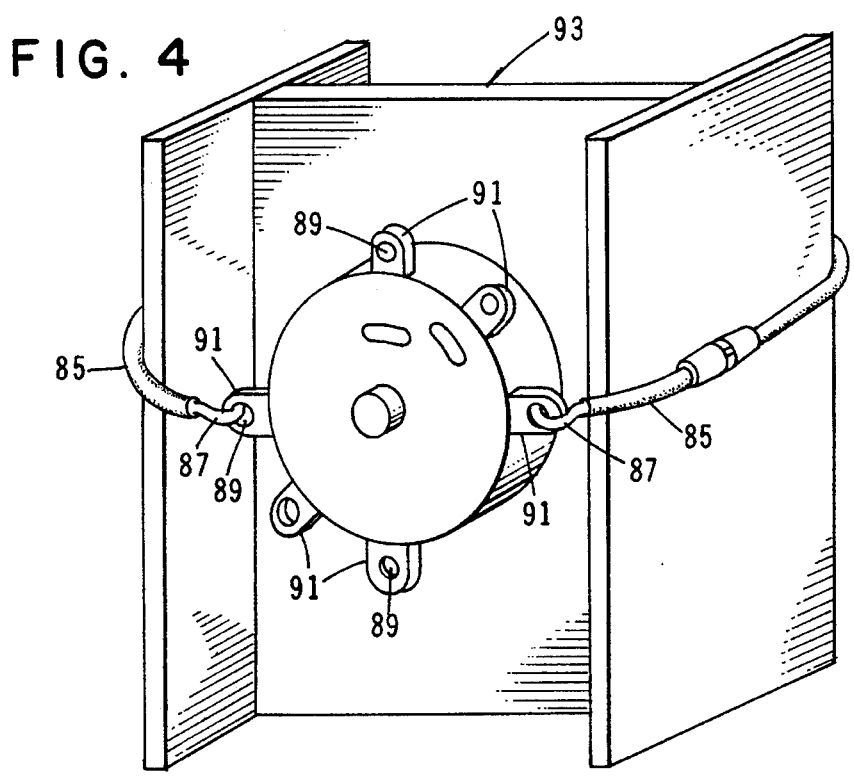
FIG. 4 is a generally perspective view of an alternate form of interconnection mechanism of the apparatus for interconnecting the apparatus to a structural member.

Turning next to FIG. 4, an alternate form of the strain gage apparatus of the invention is there shown. This apparatus is identical in most respects to that previously described herein, save that a different type of mounting mechanism is provided. More particularly, when the structure being measured is constructed from a non-ferrous metal to which magnet 28 will not be attracted, alternate initial fastening means are provided. These alternate fastening means are here shown as a pair of elastomeric cords 85 each of which includes a hook-like portion 87. Hooks 87 are receivable within apertures 89 provided in ears 91 which extend outwardly from the housing of this latter embodiment of the invention. With this construction, the strain gage assembly is initially connected to the structure 93 being measured by stretching elastomeric cords 85 around the structure in a manner shown in FIG. 4 so as to hold the housing firmly in position while the adhesive previously placed on the strain gage array and on the structure 93 sets up.

Turning lastly to FIG. 5, one form of the electrical circuitry of the apparatus of the invention is there schematically shown. The resistor divider portion of the circuit, which comprises resisters R13 and R14 (typically 1K–1 Meg Ohms) creates a voltage midway between the positive and negative supply voltages (Excitation – and Excitation +). This voltage is applied to the non-inverting inputs of both operational amplifiers (shown as X1 and X2 in FIG. 5). Due to negative feedback from the output of each operational amplifier to its inverting input through a feedback resistor (R9 or R10), the inverting input is held to the same voltage as the non-inverting input.

An input voltage applied to one of the signal inputs injects a current through the input resistor (R1 through R8) into the summing junction at the inverting input of the respective operational amplifier. Feedback from the output of the operational amplifier through the feedback resistor (R9 and R10) injects a current equal in magnitude but opposite in direction into the inverting input in order to maintain the voltage at the inverting input at the same level as the voltage at the non-inverting input. Resistors R1 through R8 are typically 1K–1 Meg Ohms as are resistors R9 and R10.

The current through the feedback resistor (R9 or R10) creates an output voltage. This output voltage can be defined as:

<Signal Out>=–<Signal In> * Rfeedback/Rinput

It is to be noted that the output voltage is negative when the input is positive because the operational amplifier is creating a current opposite in sign but the same in magnitude compared with the input current.

Additional voltages at the other signal inputs create similar currents through their respective input resistors (R1 through R8) which create similar but additive currents through the associated feedback resistor (R9 or R10) and increase the output voltage. The total output voltages is:

<Signal Out>=–(<Signal In 1>+<Signal In 2>+<Signal In 3>+<Signal In 4>) * (Rfeedback/Rinput)

Uncorrelated noise at the inputs only adds as the square root of the number of inputs. In other words, 4 inputs yield a 4 times gain in signal but only a 2 times gain in uncorrelated noise. This means that the summing amplifier increases the signal to noise ratio by 2 times or 6 decibels. This effect is independent of the gain set by the feedback and input resistors.

The output resistors (R11 and R12) set the output impedance on this circuit. This allows the circuit output to simulate a wheatstone bridge for equipment which is designed for a wheatstone bridge input. R11 and R12 are typically 1000 to 20,000 ohms.

In a practical application, several independent wheatstone bridges that are on the same structure are connected to the inputs. The output voltage will be a differential voltage which is the arithmetic sum of the individual differential voltages.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A strain measuring device for measuring deflection in a load-bearing structural member comprising:

(a) sensor means for sensing deflection in the structural member including a sensing array comprising a plurality of foil strain gages arranged in a wheatstone bridge configuration, each said foil strain gage having an electrical output;

(b) mounting means for mounting said sensor means to the structure comprising:

(i) a hollow housing;

(ii) a magnet carried within said hollow housing for engagement with the structure;

(iii) a pressure plate carried by said housing;

(iv) connector means for connecting said sensor array to said pressure plate; and (v) biasing means carried by said hollow housing for urging said pressure plate toward the structure, said biasing means comprising:

a. a spring assembly; and b. release means for releasably interconnecting said spring assembly to said housing; and (c) summing means for summing said electrical output of said foil strain gages arranged in said wheatstone bridge configuration.

2. A device as defined in claim 1 in which said magnet is generally annular in shape and in which said spring assembly is carried within said magnet.

3. A device as defined in claim 2 in which said spring assembly includes a threaded shaft and in which said release means comprises a threaded connector rotatably carried by said housing for threadable interconnection with said shaft.

4. A device as defined in claim 3 in which said pressure plate is connected to said shaft.

5. A device as defined in claim 4 in which said connector means comprises a thin sheet of elastomeric material disposed between said pressure plate and said sensor array.

6. A device as defined in claim 4 in which said summing means comprises a summing amplifier carried by said housing.

7. A strain measuring device for measuring deflection in a load-bearing structural member comprising:

(a) sensor means for sensing deflection in the structural member including a sensing array comprising a plurality of foil-type strain gages arranged in a wheatstone bridge configuration, each said strain gage having an electrical output; and (b) mounting means for mounting said sensor means to the structure comprising:

(i) a hollow housing;

(ii) a magnet carried within said hollow housing for engagement with the structure;

(iii) a pressure plate carried by said housing;

(iv) connector means for connecting said sensor array to said pressure plate; and (v) biasing means carried by said hollow housing for urging said pressure plate toward the structure, said biasing means comprising:

(a) a spring assembly; and (b) release means for releasably interconnecting said spring assembly to said housing.

8. A device as defined in claim 7 further including summing means carried by said hollow housing of said mounting means for summing said electrical output of said foil strain gages.

9. A device as defined in claim 7 in which said magnet is generally annular in shape and in which said spring assembly is carried within said magnet.

10. A device as defined in claim 7 in which said spring assembly includes a threaded shaft and in which said release means comprises a threaded connector rotatably carried by said housing for threadable interconnection with said shaft.

11. A device as defined in claim 10 in which said pressure plate is connected to said shaft.

12. A strain measuring device for measuring deflection in a load-bearing structural member comprising:
   (a) sensor means for sensing deflection in the structural member including a sensing array comprising a plurality of strain gages, each having an electrical output; and
   (b) mounting means for mounting said sensor means to the structure comprising:
      (i) a hollow housing;
      (ii) a magnet carried within said hollow housing for engagement with the structure;
      (iii) a pressure plate carried by said housing;
      (iv) connector means for connecting said sensor array to said pressure plate; and
      (v) biasing means carried by said hollow housing for urging said pressure plate toward the structure, said biasing means comprising:
         (a) a spring assembly; and
         (b) release means for releasably interconnecting said spring assembly to said housing; and
         (c) summing means carried by said hollow housing of said mounting means for summing said electrical output of said strain gages.

13. A device as defined in claim 12 in which said sensor array comprises a plurality of foil strain gages arranged in a wheatstone bridge configuration.

14. A device as defined in claim 12 in which said summing means comprises a summing amplifier carried by said housing.

15. A device as defined in claim 12 further including fastening means for fastening said hollow housing to a nonferrous structural member.

16. A device as defined in claim 15 in which said fastening means comprises a plurality of elastomeric cords connected to said hollow housing.

17. A device as defined in claim 16 in which said hollow housing includes outwardly extending apertured ears and in which said elastomeric cords include hooks receivable within said apertured ears.

* * * * *